(No Model.)

F. SCHUTZE.
INHALER.

No. 581,374.  Patented Apr. 27, 1897.

Witnesses.
G. J. Redfern
F. W. Price

Inventor:
F. Schutze

UNITED STATES PATENT OFFICE.

FREDERICK SCHUTZE, OF LONDON, ENGLAND.

INHALER.

SPECIFICATION forming part of Letters Patent No. 581,374, dated April 27, 1897.

Application filed September 12, 1896. Serial No. 605,564. (No model.)

*To all whom it may concern:*

Be it known that I, FREDERICK SCHUTZE, a subject of the Queen of Great Britain, residing at London, England, have invented new and useful Improvements in and Connected with Inhalers, of which the following is a specification.

This invention relates to inhalers, and has for its object to combine the advantages of a menthol cone with an inhaler, so that the menthol cone can be applied externally to the afflicted part it is desired to treat or the menthol vapors may be inhaled either alone or together with the vapors of valuable remedial agents, such as camphor, eucalyptus, terebene, or creosote, for the treatment of neuralgia, headache, colds, coughs, relaxed throats, lung catarrhs, and other like ailments.

Figure 1:
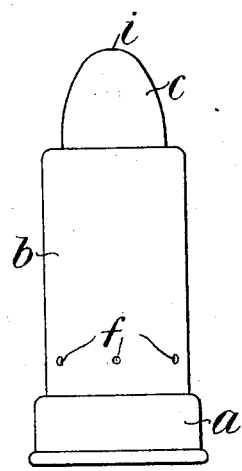
Figure 3:
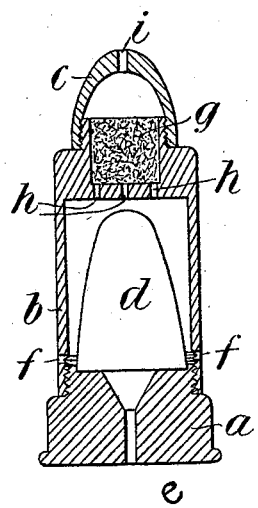
Figure 2:
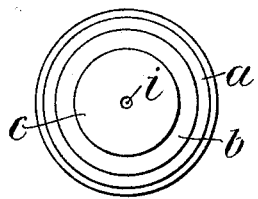
Figure 4:
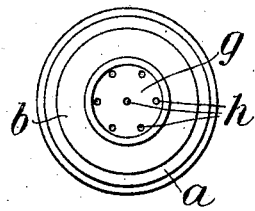

In the accompanying drawings, Figure 1 is an elevation, and Fig. 2 a plan, of my improved inhaler. Fig. 3 is a vertical section of the inhaler, and Fig. 4 is a plan with the cap removed.

My improved inhaler is constructed of a receptacle or holder advantageously formed in three parts $a\ b\ c$, the lower part or base $a$ being recessed, as shown, to receive a menthol cone $d$ and formed with an air-opening $e$. The central part $b$ of the receptacle is connected to the base $a$ by suitable means, such as screw-threads, and forms a chamber provided with air-openings $f$ and having at its upper part a recess $g$, communicating by openings $h$ with the said chamber. The recess $g$ is adapted to hold a piece of cotton-wool or the like, saturated with camphor, eucalyptus, terebene, creosote, or other suitable remedial agent. The upper part $c$ of the receptacle forms a cap in the form of a dome perforated at $i$ and formed to screw on the central part $b$, the vapors from the saturated cotton-wool and the menthol being inhaled through the said perforation $i$. Should it be desired to use the menthol cone externally by rubbing it on the affected part, the parts $b$ and $c$ of the receptacle are disconnected from the base $a$ and the menthol cone can then be applied. To inhale the menthol vapors alone, the saturated cotton-wool is removed from the middle chamber $b$.

I propose to call my improved inhaler "The Eddystone Menthol Cone Inhaler."

Having now particularly described and ascertained the nature of my said invention and in what manner the same is to be performed, I declare that what I claim is—

The described inhaler, made in three parts $a$, $b$, $c$, the part $a$, being a base and perforated as shown and having a chamber or recess to receive a menthol cone, the part $b$, adapted to be secured thereto and to inclose said cone, and provided with openings $f$, near its bottom, and having at its upper part a recess $g$, communicating by openings with said chamber, and the upper part or cap $c$, over such recess and having a perforation $i$, and constituting a dome over the medicament or remedial agent in such recess.

FREDERICK SCHUTZE.

Witnesses:
G. F. REDFERN,
JOHN E. BOUSFIELD.